(12) United States Patent
Djefel (10) Patent No.: US 11,300,702 B2
(45) Date of Patent: Apr. 12, 2022

(54) VISUALIZING FORMATION BOUNDARIES IN NEAR-VERTICAL WELL DRILLING

(71) Applicant: HALLIBURTON ENERGY SERVICES, INC., Houston, TX (US)

(72) Inventor: Bronwyn Michelle Djefel, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 93 days.

(21) Appl. No.: 16/778,803

(22) Filed: Jan. 31, 2020

(65) Prior Publication Data

US 2021/0239873 A1    Aug. 5, 2021

(51) Int. Cl.
| | |
|---|---|
| *G01V 3/38* | (2006.01) |
| *E21B 47/002* | (2012.01) |
| *E21B 49/00* | (2006.01) |
| *G01V 3/20* | (2006.01) |

(52) U.S. Cl.
CPC .............. *G01V 3/38* (2013.01); *E21B 47/002* (2020.05); *E21B 49/00* (2013.01); *G01V 3/20* (2013.01)

(58) Field of Classification Search
CPC .......... G01V 3/38; G01V 3/20; E21B 47/002; E21B 49/00
See application file for complete search history.

(56) References Cited

U.S. PATENT DOCUMENTS

| | | | |
|---|---|---|---|
| 2003/0229450 A1 | 12/2003 | Strickland | |
| 2013/0144529 A1* | 6/2013 | Seydoux | G06F 19/00 702/7 |
| 2015/0292266 A1* | 10/2015 | Johnson | E21B 7/06 |
| 2017/0123097 A1* | 5/2017 | Fang | G01V 3/38 |
| 2018/0172872 A1* | 6/2018 | Fouda | G01V 3/28 |
| 2021/0055448 A1* | 2/2021 | Thiel | G01V 3/38 |

FOREIGN PATENT DOCUMENTS

| | | |
|---|---|---|
| WO | 2018075027 | 4/2018 |
| WO | 2020013812 | 1/2020 |

OTHER PUBLICATIONS

PCT Application No. PCT/US2020/016185, International Search Report and Written Opinion, dated Oct. 28, 2020, 11 pages.

* cited by examiner

*Primary Examiner* — Tarun Sinha
*Assistant Examiner* — Lal C Mang
(74) *Attorney, Agent, or Firm* — Kilpatrick Townsend & Stockton LLP (57) ABSTRACT

A wellbore visualization system can receive electromagnetic field data related to a formation from a downhole tool in a wellbore. The visualization system generates a first inversion slice that represents an inversion of the electromagnetic field data about the formation at a first true vertical depth. The visualization system generates a second inversion slice that represents an inversion of the electromagnetic field data about the formation at a second true vertical depth. The visualization system generates an inversion stack comprising the first inversion slice and the second inversion slice. The visualization system presents a user interface comprising the inversion stack for use to determine a distance from the formation to the downhole tool in the wellbore.

20 Claims, 8 Drawing Sheets

VISUALIZING FORMATION BOUNDARIES IN NEAR-VERTICAL WELL DRILLING

TECHNICAL FIELD

The present disclosure relates generally to tools usable in drilling a wellbore for extracting hydrocarbons and, more particularly (although not necessarily exclusively), to visualizing look-ahead, ultra-deep resistivity measurements downhole.

BACKGROUND

A well system (e.g., oil or gas) may include a wellbore drilled through a subterranean formation. The subterranean formation may include a rock matrix permeated by oil or gas that is to be extracted using the well system. During the drilling operation, a drill bit may approach or pass through various rock formation boundaries in the rock matrix. Logging positions of the drill bit and the various rock formation boundaries during the drilling operation assists in identifying the location of a particular boundary.

Visualizing formation positions and boundaries while drilling into the earth provides information to surface controllers and personnel. Providing downhole information to a surface computing system improves safety, efficiency, and reliability of wellbore drilling. Visualization of boundary locations that are deeper and near the path of the drill bit (e.g., near-vertical drilling) is difficult because of the geometry of the sensor equipment and formats of presentation that lack the precision necessary.

DETAILED DESCRIPTION

Certain aspects and examples of the present disclosure relate to visualizing a representation of a formation boundary in a near vertical drilling system. Inversion slices that represent inversions of electromagnetic field data representing a single or multiple formations can be generated. Then an inversion stack with the inversion slices can be generated. The inversion stack can be displayed on a user interface and used to determine a distance from the formation to a downhole tool in the wellbore. The information on the user interface can be used to make decisions in drilling the wellbore.

An example of a formation is a subsurface rock formation, which in some cases contains petroleum, natural gas, or other hydrocarbon fluids desired to be pumped to the surface. Visualizing locations that are at a depth below the drill bit (e.g., in near-vertical drilling) is difficult given the detection equipment and the geometry of downhole tool string and the direction of drilling. In some examples, the detection equipment for measuring rock formations downhole can include taking ultra-deep electromagnetic (UDEM) measurements that describe the surrounding rock matrix. Electromagnetic measurements can include using a sensor attached to the downhole tool string and oriented to receive omnidirectional electromagnetic data. As the depth of the wellbore increases to ultra-deep (e.g., deeper than 5000 feet of true vertical depth), specific challenges such as high pressure, narrow pressure bands and high temperature pose risks to penetrating formation boundary layers. Generating a visualization of the formation boundary with reference to the drill bit position improves safety accuracy of the drilling process.

Electromagnetic data collection (e.g., electromagnetic resistivity, conductivity, etc.) can allow for calculating a distance from the drill bit position to nearby formation boundaries. One example of electromagnetic data is the formation resistivity, given there is a contrast of resistivity across the boundary. Generating visualizations that stack the electromagnetic data enables a more precise representation of the formation boundary relative to the drill bit. The visualization provides iterative derivation of the formation boundary position (i.e., the formation boundary is more accurate with each iteration) by aggregating a representation of the resistivity as the bottom-hole assemble (BHA) drills closer to the boundary. The resulting visualization can be used by drillers and geologists to interpret the geology ahead (e.g., in the direction of drilling) of the bit. By interpreting the geology ahead of the drill bit, the drillers and geologists can implement safety and preparation procedures prior to crossing a formation boundary. Implementing safety procedures based on the visualization can reduce errors relating to drilling hazards such as over or under pressure zones (e.g., a zone with abnormally higher or lower than hydrostatic pressure respectively), casing points, and unconformities.

A user interface can display a visualization of electromagnetic data and the drill bit position. The user interface display can include visualizations from 1-D (i.e., a point or line chart) to 3-D shapes. The display can include the well path (e.g., the planned or previous positions of drill path), the downhole tool string, the bottom hole assembly, drill bit, or other elements. For near vertical wellbore drilling, the visualization can be displayed including an inclination angle (i.e., the angle measured from a virtual vertical axis) of the well. For example, the user interface can display a true vertical depth (TVD) along the y-axis and vertical section (or true horizontal distance) along the x-axis. The user interface can display the electromagnetic data from the sensor as slices of data centered on the calculation point (CP). In some examples, the calculation point is at the transmitter/sensor location, but, other locations can be used.

In some cases, slices of data may be depicted as angled slices of electromagnetic data representing characteristics of the rock formation and formation boundary. The angled slices of electromagnetic data can enable the user interface to display a stack the slices (e.g., aggregated or overlaid slices) as the drill bit progresses into the earth. By stacking the slice of electromagnetic data, the user interface can display older information (i.e., previously received information) and an initial estimate of the formation boundary at locations further away from the bit (in the x-axis direction), and as at the BHA moves closer to the formation top, the estimates of the formation boundary location generally improve and these results are displayed closer to the depicted position of the drill bit laterally (x-axis).

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
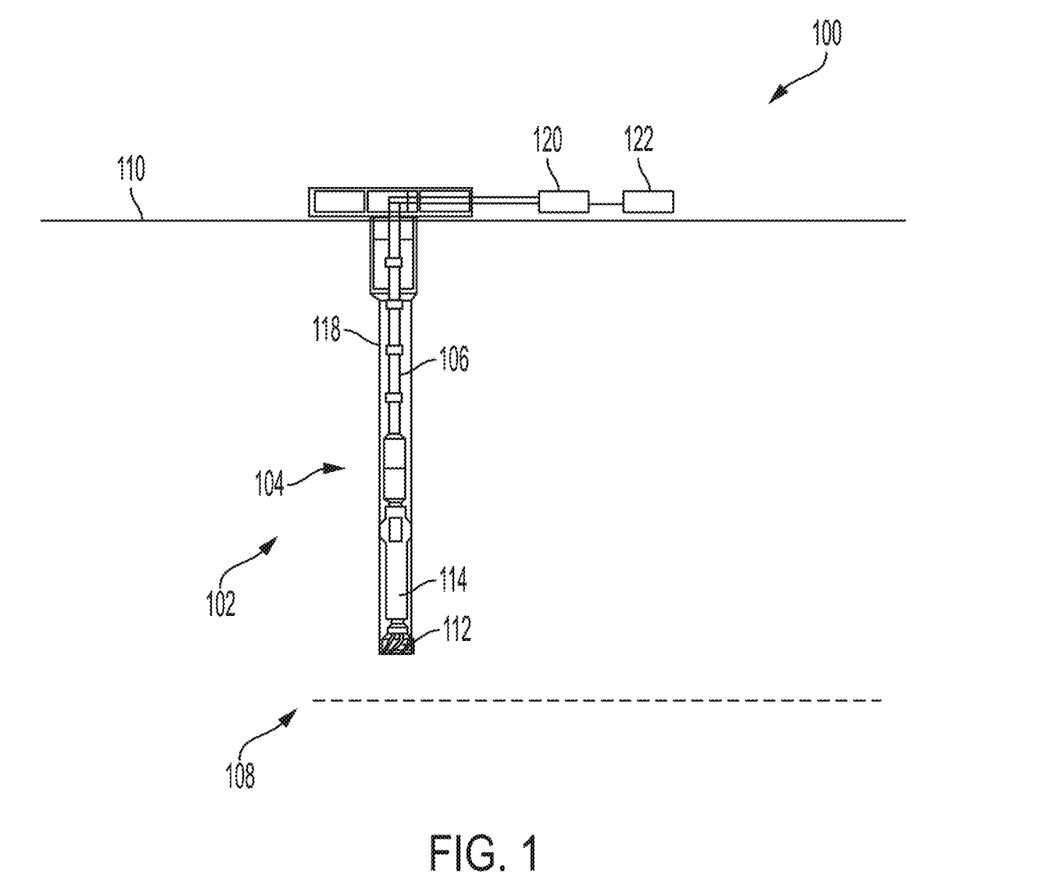
FIG. 1 is a cross-sectional view of a well drilling system according to one example of the present disclosure.

FIG. 1 is a cross-sectional of a well drilling system according to one example of the present disclosure. A wellbore 118 may be created by drilling into the earth 102 using drilling system 100. Drilling system 100 may be configured to drive a BHA 104 positioned or otherwise arranged at the bottom of a drill string 106 extended into the earth 102 from the surface 110. The drilling system 100 may include a drilling system control 120 and a computing system 122 positioned at the surface 110. The BHA 104 may include a drill bit 112 and a downhole tool 114. The drill bit 112 may dig into the earth 102 towards a formation boundary 108. The downhole tool 114 may receive electromagnetic field data from the formation boundary 108 and transmit it to the computing system 122.

For example, the downhole tool 114 may be an electromagnetic sensor (e.g., a sensor sensitive to approximately 1-64 kHz) that receives an electromagnetic field strength from the formation boundary 108. The downhole tool 114 may provide the electromagnetic field strength to the computing system 122 at the surface 110 for processing to determine a distance from the formation boundary 108 to the drill bit 112. The computing system 122 may use the electromagnetic data received from the downhole tool 114 to calculate a distance to a nearby formation boundary 108 and the formation resistivity, given there is a contrast of resistivity across the boundary. The computing system 122 may perform an inversion on the electromagnetic data to generate a visualization of the resistivity of the formation boundary 108. The computing system 122 may present the visualization to a user of the computing system 122 or transmit it via a network to another computing platform or system.

Figure 2:
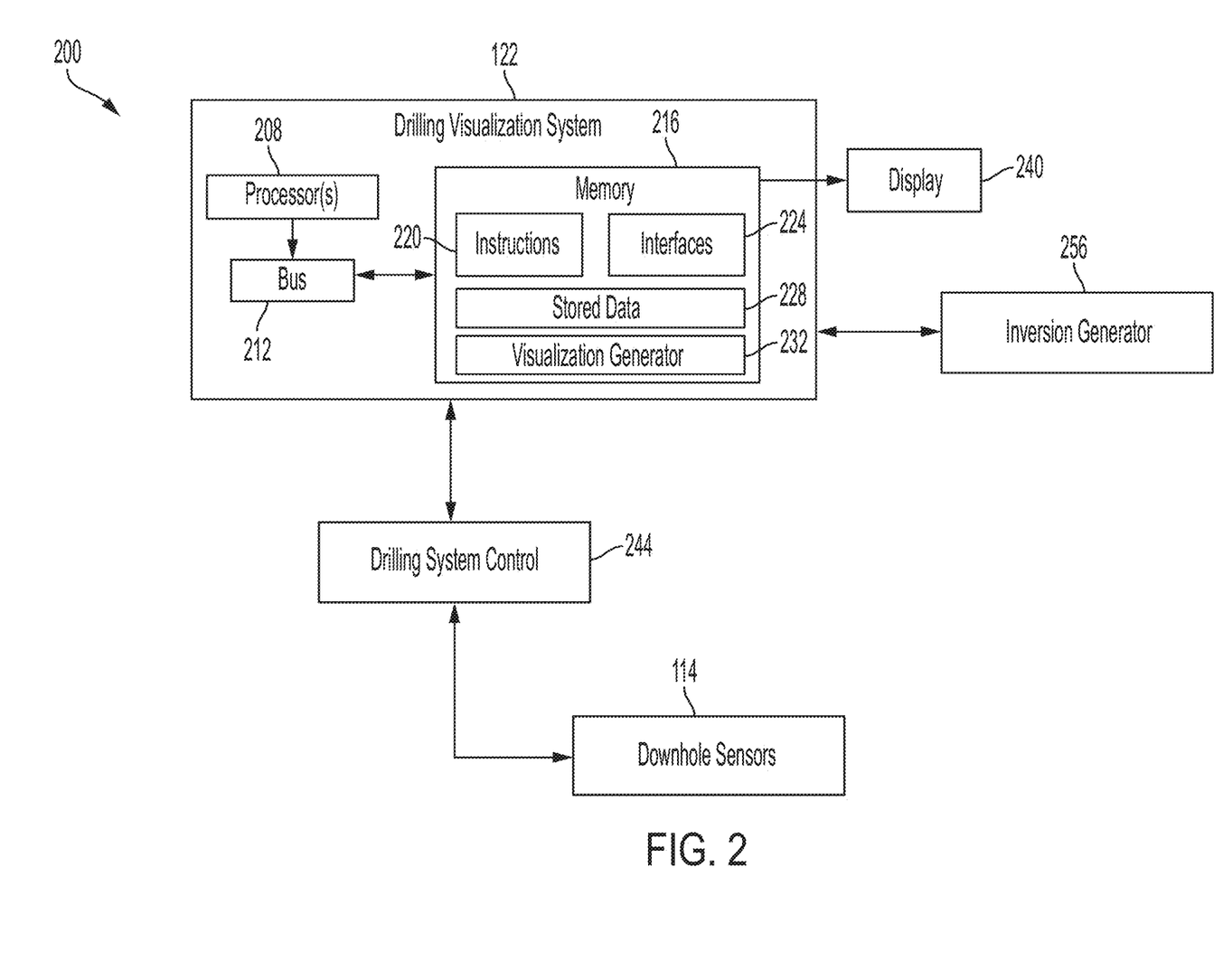
FIG. 2 is a block diagram of a computing system for generating visualizations of formations according to one example of the present disclosure.

FIG. 2 is a block diagram of a computing system for generating visualizations of formations according to one example of the present disclosure. Computing system 200 includes a drilling visualization system 122, a display 240, an inversion generator 256, a drilling system control 244, and downhole sensors 114. For instance, the computing system 122 may be one or more computing devices that receive electromagnetic data and generate visualizations to display in a user interface on display 240. The computing device 122 may include a processor 208 and a non-transitory computer-readable medium 216 that includes instructions 220 that are executable by the processor to perform various operations herein.

The drilling control system 244 may be one or more computing devices that include multiple input and outputs for processing drilling operations. For example, the drilling control system 244 may provide control inputs to the physical drilling system such as hydraulic or electrical systems that adjust the rate, speed, and direction of the drill bit. The drilling control system 244 may also receive inputs from the downhole sensors 114 relating to drilling environmental and system conditions.

The drilling visualization system 122 may include a non-transitory memory 220 that includes an executable visualization generator 232. The visualization generator 232 may be executable by a processor 208 of the drilling visualization system 122. In one example, the visualization generator 232 receives, via a bus 212, electromagnetic data from downhole sensors 114. The visualization generator 232 may generate an inversion of the electromagnetic data that represents the resistivity of the formation boundary. The visualization generator 232 may generate a visualization of an inversion slice that represents the resistivity at a true vertical depth. The drilling visualization system 122 may also include memory 216 for storing instructions 220 for execution on the processor 208. The memory can also include stored data 228, such as previous visualization data, parameters for generating visualizations (e.g., screen size, axis selections, etc.), interfaces 224 for reading and writing data.

The drilling visualization system 122 may also receive a true vertical depth from the downhole tool representing a current position of the drill bit 112. In some examples, the true vertical depth may be equal to the measured depth (i.e., a vertical wellbore), while in other examples, the true vertical depth may be defined by a relationship to the measured depth (i.e., an inclined wellbore). The visualization generator 232 may use the true vertical depth as a first axis of the visualization and the measured depth as a second axis of the visualization. An example of display 240 may be a presentation screen, a television, a touchscreen (e.g., a smart phone or tablet), either locally or remotely coupled to the drilling visualization system 122.

The visualization generator 232 may send the electromagnetic data to an inversion generator 256 (e.g., a cloud processing system) that responds by performing one or more inversions on the electromagnetic data. The inversion generator 256 sends the inverted electromagnetic data to the visualization generator 232. Examples of an inversion slice are likely best understood with reference to FIGS. 4-7. The drilling visualization system 122 may also be coupled to a drilling system control 244 for controlling movement of the downhole tools, drill bit, or bottom hole assembly. In other examples, the inversion generator 256 may be included in drilling visualization system 122. The visualization generator 232 may then provide a user interface to the display 240 for presentation to a user.

Figure 3:
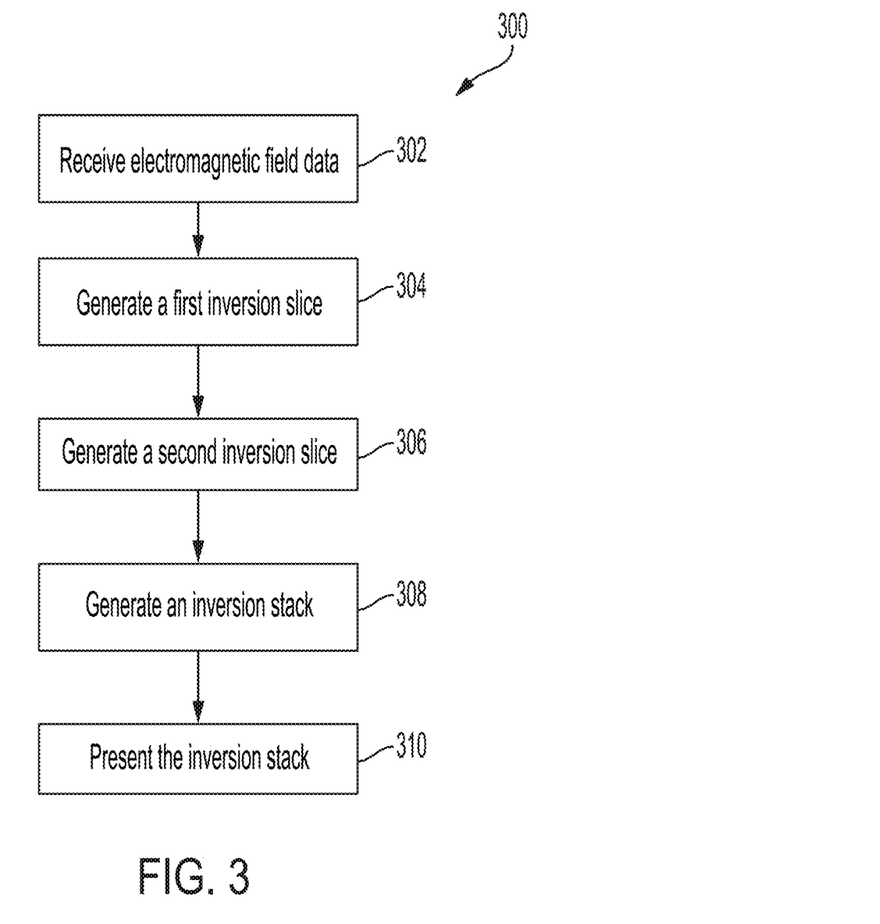
FIG. 3 is an example of a flowchart of a process for visualizing formation boundaries using measurements downhole according to one example of the present disclosure.

FIG. 3 is an example of a flowchart of a process for visualizing formation boundaries using measurements downhole according to one example of the present disclosure. For example, one or more operations included in process 300 may be performed by computing system 122.

At block 302, the process 300 involves receiving electromagnetic field data related to a formation. For example, the visualization generator may receive electromagnetic field data from measurements by the downhole tool. The downhole tool may measure electromagnetic characteristics of a formation boundary, or other electromagnetic indications of a formation boundary ahead (i.e., in the direction of drilling) of the drill bit. The visualization generator may receive the electromagnetic field data over a wired or wireless communication network (i.e., mud pulse telemetry, other wireless communicative network) from the downhole tool.

At block 304, the process 300 involves generating a first inversion slice that represents an inversion of the electromagnetic field data about the formation at a first true vertical depth. For example, the visualization generator may generate an inversion of the electromagnetic data representing the formation boundary. The visualization generator may apply a color scale to the inverted electromagnetic data. In one example, the visualization generator depicts the first inversion slice as an angled slice. The visualization generator may use any angle for the slice as measured from a virtual vertical axis that passes through the position of the downhole tool at the true vertical depth. The visualization generator generates an angular slice that enables stacking multiple inversion slices as described elsewhere herein.

At block 306, the process 300 involves generating a second inversion slice that represents an inversion of the electromagnetic field data about the formation at a second true vertical depth. The visualization generator may generate a second inversion of the electromagnetic data representing the formation boundary. For example, the visualization generator may generate the second inversion that represents the inverted electromagnetic data calculated at a subsequent position of the BHA (e.g., an increased true vertical depth compared to the first inversion slice).

At block 308, the process 300 involves generating an inversion stack including the first inversion slice and the second inversion slice. For instance, the visualization generator may generate multiple inversions representing electromagnetic data as the BHA and downhole tool progress deeper into the earth. The visualization generation overlaps the inversion slices on top of each other as the BHA progresses into the earth. The visualization generator stacks the inversion slices by generating a representation of each slice from the calculation point (e.g., the true vertical depth of the downhole tool). The resulting visualization depicts the older information (e.g., the electromagnetic data from a previous true vertical depth) and initial estimate of the formation boundary top is further away from the bit (in the x-axis direction), and as the BHA moves closer to the formation top, the estimates generally improve and these results are displayed closer to the bit laterally (x-axis). The inversion stack is likely best understood with reference to FIGS. 4-7.

At block 310, the process 300 involves displaying a user interface comprising the inversion stack for use to determine a distance from the formation to the downhole tool in the wellbore. For instance, the visualization generator may provide the inversion stack to a display for presentation to a user via a user interface. The visualization generator may present the inversion stack via a locally coupled display, a remote display, or may send a set of parameters for another computing system for additional processing or presentation.

Figure 4:
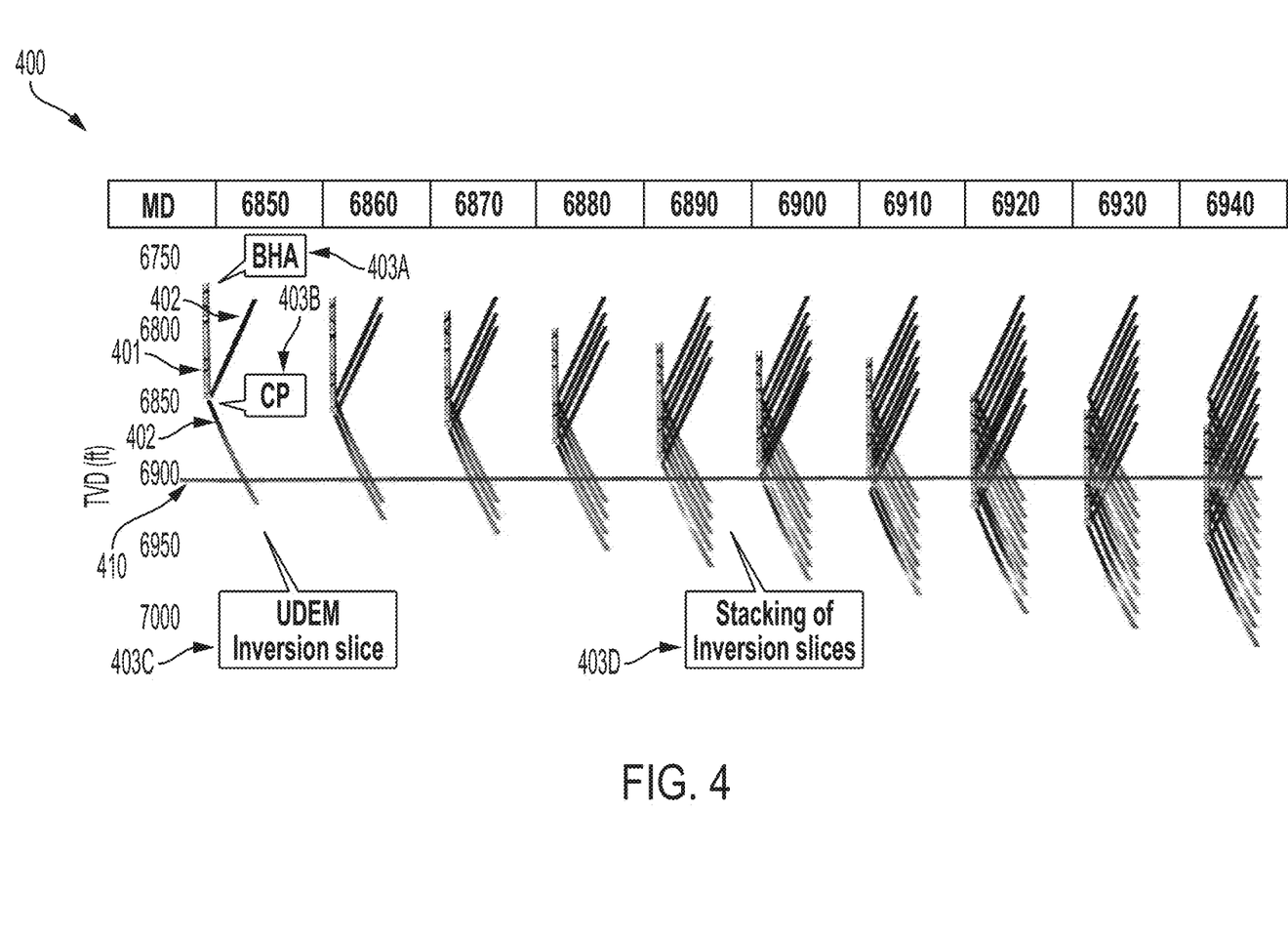
FIG. 4 is an example of a graphical user interface for visualizing formation boundaries using a series of narrow inversion slices, according to one example of the present disclosure.

FIG. 4 is an example of a graphical user interface for visualizing formation boundaries using a series of narrow inversion slices, according to one example of the present disclosure. For instance, the display 240 of FIG. 2 may present the graphical user interface 400 including the inversion stack. While FIG. 4 is presented as increasing the number of inversion slices from left to right, it can also be implemented as a single stack in the graphical user interface 400. FIG. 4 presents each inversion stack as a plot of intensities at a specific measured depth (MD) and true vertical depth (TVD).

The graphical user interface 400 includes a visual representation of the downhole drilling environment. As illustrated by FIG. 4, the graphical user interface 400 includes a horizontal axis of measured depth and a vertical axis representing true vertical depth. The graphical user interface 400 includes calculation point 401 (i.e., 6850 feet) and an inversion slice 402 with an upper and lower portion.

In a first example, the graphical user interface 400 may present the first inversion slice 402 that includes an upper portion above the calculation point (i.e., 6850 feet) and a lower portion below the calculation point. The graphical user interface 400 may include labels of components of the drilling system such as BHA label 403A, calculation point label 403B, or inversion slice label 403C.

In a second example, the graphical user interface 400 may present the first inversion slice, the calculation point 401, and a second inversion slice. As compared with the first example, the calculation point 401 is at a greater true vertical depth and measured depth than calculation point 401, and the second inversion slice represents that electromagnetic data received at the calculation point 401 at the measured depth 6860 feet.

In a third example, the graphical user interface 400 may present first inversion slice, the calculation point 401, the second inversion slice, and a third inversion slice. As compared with the first and second examples, the calculation point 401 is at a greater true vertical depth and measured depth (i.e., 6870 feet) than calculation points of the previous examples, and the third inversion slice represents that electromagnetic data received by the downhole tool at the calculation point of 6870 feet measured depth. The visualization generator overlays the first inversion slice, the second inversion slice, and the third inversion slice as described with reference to FIG. 3.

In a fourth example, the graphical user interface 400 may present first inversion slice, the calculation point 401, the second inversion slice, the third inversion slice, and a fourth inversion slice. As compared with the previous examples, the calculation point is at a greater true vertical depth and measured depth (i.e., 6880 feet) than the calculation points of the previous examples, and the fourth inversion slice represents that electromagnetic data received by the downhole tool at the calculation point of 6880 feet measured depth. The visualization generator overlays the first inversion slice, the second inversion slice, the third inversion slice, and the fourth inversion slice as described with reference to FIG. 3.

In the further examples illustrated in FIG. 4, the graphical user interface 400 may present any number of inversion slices that may be stacked. As illustrated by FIG. 4, as the BHA progresses toward the formation boundary 410 (i.e., showing the BHA at increasing true vertical depths), the graphical user interface 400 indicates that the greater intensity of the electromagnetic data (e.g., the darker portion of the slice), the formation boundary becomes more well defined using the stacked slices.

Figure 5:
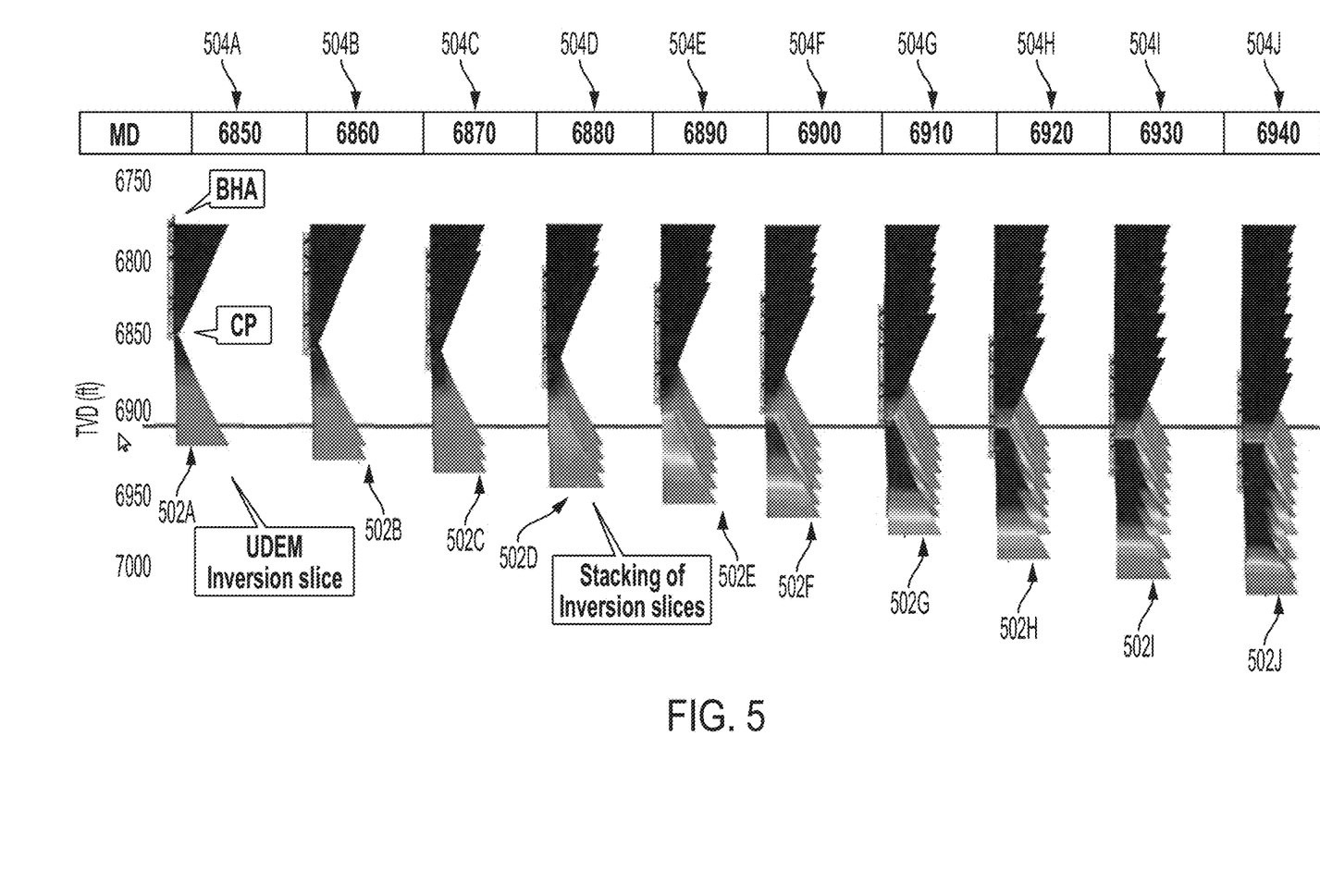
FIG. 5 is another example of a graphical user interface for visualizing formation boundaries using a series of full-wedge inversion slices, according to one example of the present disclosure.

FIG. 5 is another example of a graphical user interface for visualizing formation boundaries using a series of full-wedge inversion slices, according to one example of the present disclosure. For instance, the visualization generator may generate the inversion stack 502A in various shape formats. In one example, the visualization generator creates the inversion slice with a top triangle, a bottom triangle, and a convergence point of the two triangles located at the respective calculation point. Each of the inversion stacks 502A-502J corresponds to a combination of true measured depths (e.g., the vertical axis) and a measured depth. As illustrated by FIG. 5, the inversion stacks 502A-502J each correspond to measured depth 504A-504J of the downhole tool.

In additional examples, the visualization generator may also generate 3-D shapes, include the electromagnetic data on both sides of the BHA (e.g., generate the visualization on both the left and right sides of the BHA and downhole tool). In a further example, the visualization generator can create and stack the inversion slices with an inclination (e.g., the BHA and downhole tool are oriented other than vertical).

Figure 6:
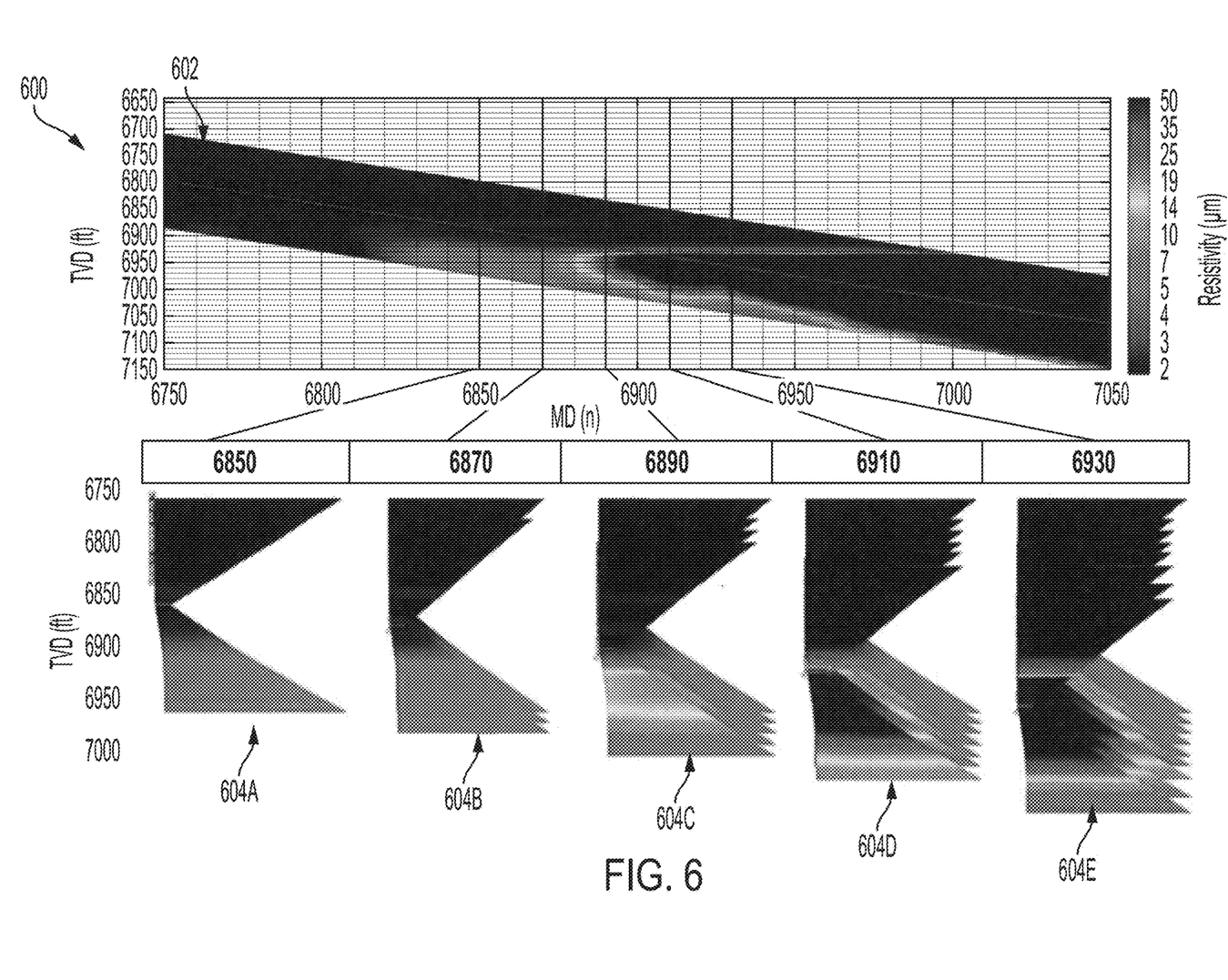
FIG. 6 is another example of a graphical user interface for visualizing formation boundaries using a combination of a continuous boundary visualization and a series of full-wedge inversion slices, according to one example of the present disclosure.

FIG. 6 is another example of a graphical user interface for visualizing formation boundaries using a combination of a continuous boundary visualization and a series of full-wedge inversion slices, according to one example of the present disclosure. For instance, the visualization generator may create a visualization overlay or multiple visualizations within the graphical user interface. In this example, the visualization generator creates a first graphical user interface element that displays the inversion of electromagnetic data in a single slice 602 and a second graphical user interface element that depicts inversion stacks 604A-604E of inversion slices. In this example, the inversion stacks 604A-604E of inversion slices depict the inversion stack at particular true vertical depths corresponding to the true vertical depth of the BHA and downhole tool. The visualization generator presents inversion stack 604A at true vertical depth 606A, inversion stack 604B at true vertical depth 606B, inversion stack 604C at true vertical depth 606C, inversion stack 604D at true vertical depth 606D, and inversion stack 604E at true vertical depth 606E. Each inversion stack 604A-604E is generated as described previously herein.

Figure 7:
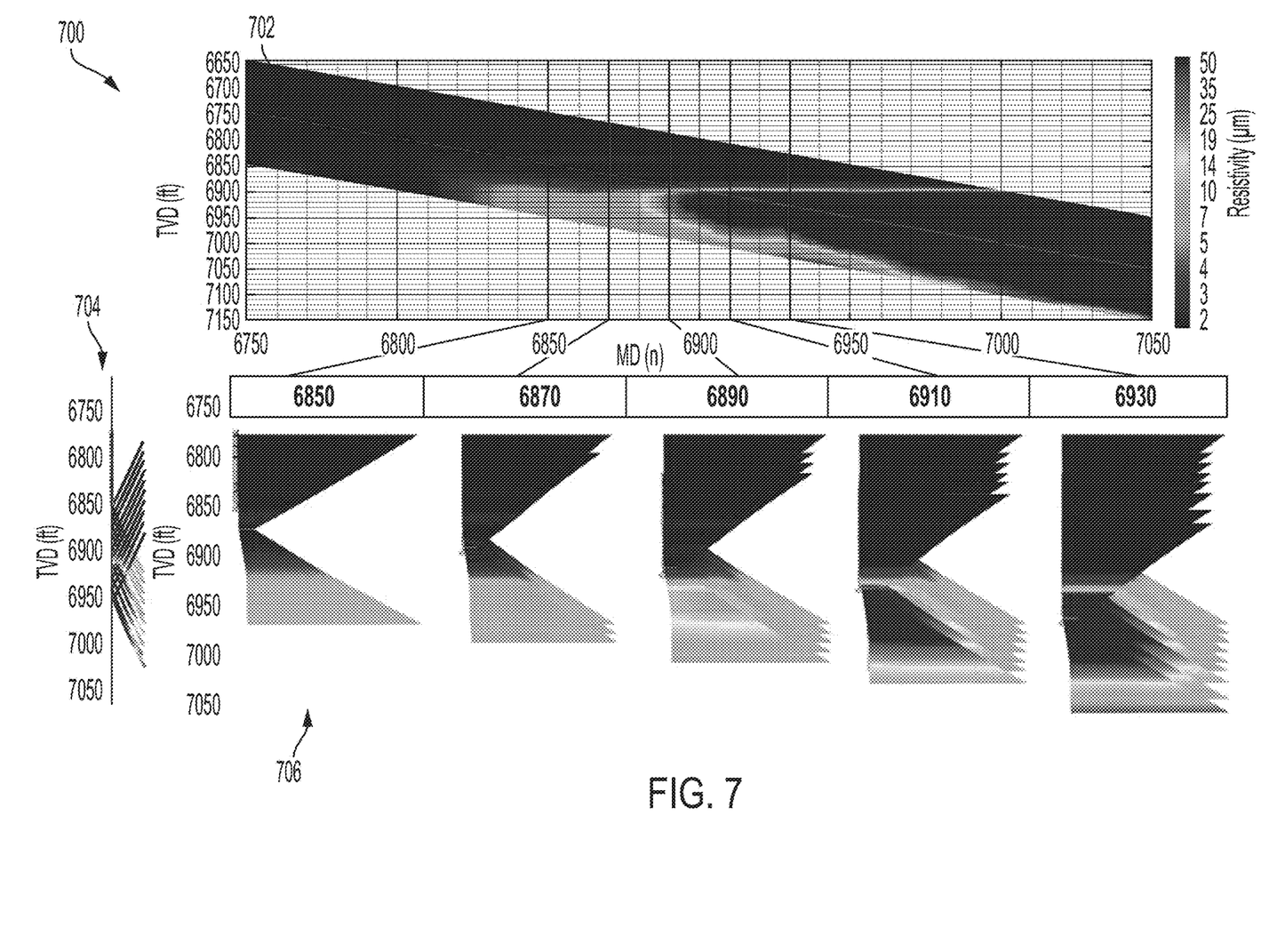
FIG. 7 is another example of a graphical user interface for simultaneously visualizing formation boundaries using a quality metric and a combination of a continuous boundary visualization, a series of narrow inversion slices, and a series of full-wedge inversion slices according to one example of the present disclosure.

FIG. 7 is another example of a graphical user interface for simultaneously visualizing formation boundaries using a quality metric and a combination of a continuous boundary visualization, a series of narrow inversion slices, and a series of full-wedge inversion slices according to one example of the present disclosure. For instance, the visualization generator can overlay multiple presentation formats in a single graphical user interface. The graphical user interface can include a first graphical user interface element 702 that displays an inversion of the electromagnetic data in a single slice, a second user interface element 704 that displays the inversion of the electromagnetic data in a series of slices as lines from the calculation point having a predetermined width, a third user interface element 706 that displays the inversion of the electromagnetic data as a series of triangular slices, and a fourth user interface element that displays a quality control indicator 708. In one example, the quality control indicator is a curvilinear representation of the intensity of the resistivity indicated by an inversion slice. The quality control indicator 708 illustrates an emphasized curve 710 (e.g., bolded, greater width, etc.) that corresponds to the most recent calculation point (i.e., the most recently generated inversion slice) and one or more de-emphasized curves (e.g., de-emphasized curve 712A and de-emphasized curve 712B) that correspond to a previous calculation point (i.e., a previously generated inversion slice). The quality control indicator 708 may represent a numerical value of the inversion that represents the electromagnetic data. In one example, the quality control indicator 708 may present raw values that correspond directly to the inversion of the electromagnetic data, while in other examples, the quality control indicator 708 may present normalized values.

Figure 8:
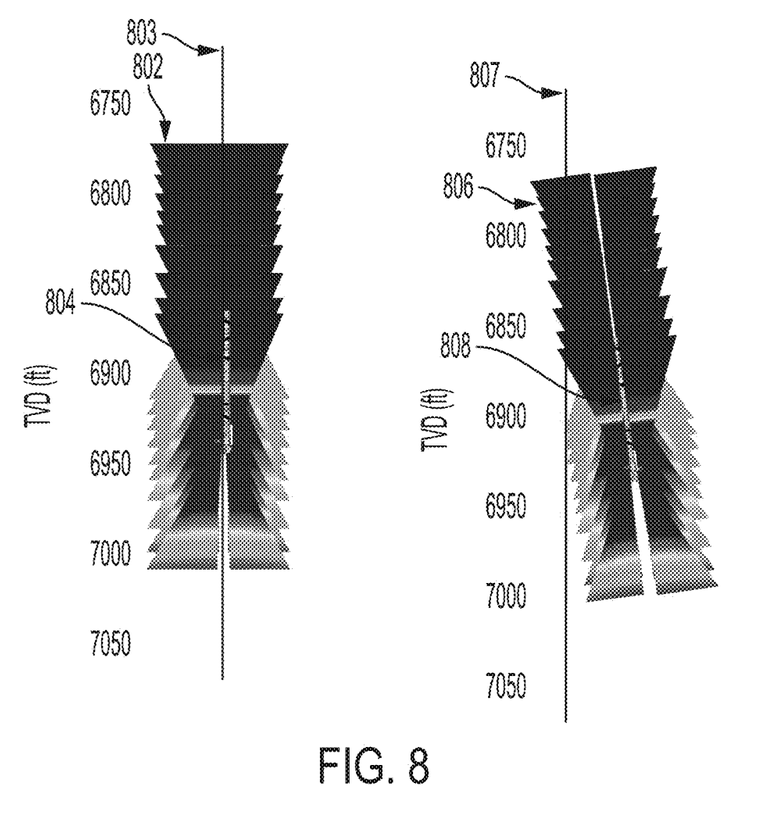
FIG. 8 is another example of a graphical user interface for visualizing formation boundaries using an inclination angle, according to one example of the present disclosure.

FIG. 8 is another example of a graphical user interface for visualizing formation boundaries using an inclination angle, according to one example of the present disclosure. For instance, the visualization generator can generate visualizations that represent various inclination angles in the graphical user interface. In one example, the inversion stack 802 depicts a representation of the electromagnetic data as a slice that extends to a left and right of a virtual axis 803 that is aligned with the bottom hole assembly 804. The virtual axis 803 may be annotated with various true vertical depths. In another example, the inversion stack 806 may be presented with an inclination angle. For some wellbores, the bottom hole assembly 808 proceeds with an inclination angle from the virtual axis 807. As illustrated by FIG. 8, the inclination angle is the angular distance measured from the virtual axis 807 to an axis centered along the bottom hole assembly 808.

In some aspects, a system, a method, and a computing system for presenting visualizations of inversion slices representing electromagnetic data related to a formation boundary are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a non-transitory computer-readable medium having program code that is stored thereon, the program code being executable by one or more processing devices for performing operations comprising: receiving electromagnetic field data related to a formation from measurements by a downhole tool in a wellbore; generating a first inversion slice that represents an inversion of the electromagnetic field data about the formation at a first true vertical depth; generating a second inversion slice that represents an inversion of the electromagnetic field data about the formation at a second true vertical depth; generating an inversion stack comprising the first inversion slice and the second inversion slice; and displaying a user interface comprising the inversion stack for use to determine a distance from the formation to the downhole tool in the wellbore.

Example 2 is the non-transitory computer-readable medium of example 1, wherein the operation of generating an inversion stack comprising the first inversion slice and the second inversion slice comprises: determining the first true vertical depth of the downhole tool; receiving, from the downhole tool, electromagnetic field data comprising an electromagnetic field strength from the downhole tool at the first true vertical depth; computing a first inversion of the electromagnetic field data representing the electromagnetic field strength from the downhole tool at the first true vertical depth; determining the second true vertical depth of the downhole tool; receiving, from the downhole tool, electromagnetic field data comprising an electromagnetic field strength from the downhole tool at the second true vertical depth; computing a second inversion of the electromagnetic field data representing the electromagnetic field strength from the downhole tool at the second true vertical depth; and stacking the first inversion and the second inversion by generating an overlay of the first inversion and the second inversion.

Example 3 is the non-transitory computer-readable medium of examples 1, wherein the operation of presenting the user interface further comprises presenting a representation of a quality control indicator that presents a numerical value representing an intensity of the electromagnetic field data at a location of a bottomhole assembly, the numerical value corresponding to electromagnetic field strength measured by the downhole tool.

Example 4 is the non-transitory computer-readable medium of examples 1-3, wherein the operation of receiving electromagnetic field data related to the formation from measurements by the downhole tool in the wellbore comprises receiving electromagnetic field data related to the formation from measurements by the downhole tool in the wellbore that has an inclination in a range of 0 degrees to 45 degrees relative to a virtual vertical axis that traverses through an opening for the wellbore in the surface.

Example 5 is the non-transitory computer-readable medium of examples 1-3, wherein the operation of presenting the user interface comprising the inversion stack for use to determine a distance from the formation to the downhole tool in the wellbore comprises: presenting a first representation of the first inversion slice representing a first electromagnetic resistivity at the first true vertical depth; presenting a second representation of the second inversion slice representing a second electromagnetic resistivity at the second true vertical depth; and presenting a formation representation by visualizing a boundary layer of the formation by changing a color from the first representation and the second representation.

Example 6 is the non-transitory computer-readable medium of examples 1-3, wherein the operation of presenting the user interface includes representing the first inversion slice, the second inversion slice, and the inversion stack as three-dimensional wedges.

Example 7 is the non-transitory computer-readable medium of examples 1-3, wherein the operation of presenting the user interface comprises: presenting a first graphical user interface element comprising: the first inversion slice depicting the first true vertical depth, an upper portion of the first inversion slice at an angle from a virtual vertical axis, and a lower portion of the first inversion slice at the angle from a virtual vertical axis; and the second inversion slice depicting the second true vertical depth, an upper portion of the second inversion slice at the angle from the virtual vertical axis, and a lower portion of the second inversion slice at the angle from the virtual vertical axis; presenting a second graphical user interface element comprising: an inversion plot of the electromagnetic field data that presents the resistivity of the formation as a function of true vertical depth and measured depth, the inversion plot having a series of vertical lines at a plurality of measured depths; presenting, for each measured depth of the plurality of measured depths: the first inversion slice depicting the first true vertical depth, an upper triangle of the first inversion slice, and a lower triangle of the first inversion slice; the second inversion slice depicting the second true vertical depth, an upper triangle of the second inversion slice, and a lower triangle of the second inversion slice at the angle from the virtual vertical axis; and presenting a third graphical user interface element comprising a plot of a quality metric for a plurality of true vertical depths.

Example 8 is the non-transitory computer-readable medium of example 1, wherein the operation of presenting the user interface comprises: presenting a first graphical user interface element comprising: the first inversion slice depicting the first true vertical depth, a left portion of the first inversion slice at an angle from a virtual vertical axis, and a right portion of the first inversion slice at the angle from a virtual vertical axis; and the second inversion slice depicting the second true vertical depth, a left portion of the second inversion slice at the angle from the virtual vertical axis, and a right portion of the second inversion slice at the angle from the virtual vertical axis; and a bottom hole assembly oriented along the virtual vertical axis.

Example 9 is the non-transitory computer-readable medium of example 1, wherein the operation of presenting the user interface comprises: presenting a first graphical user interface element comprising: a virtual vertical axis that depicts a plurality of true vertical depths; the first inversion slice depicting the first true vertical depth, the first inversion slice oriented at an inclination angle measured from the virtual vertical axis; and the second inversion slice depicting the first true vertical depth, the second inversion slice oriented at the inclination angle; and a bottom hole assembly oriented at the inclination angle.

Example 10 is a method of visualizing a formation in a well-drilling operation, the method comprising: receiving electromagnetic field data related to a formation from measurements by a downhole tool in a wellbore; generating a first inversion slice that represents an inversion of the electromagnetic field data at a first true vertical depth; generating a second inversion slice that represents an inversion of the electromagnetic field data at a second true vertical depth; generating an inversion stack comprising the first inversion slice and the second inversion slice; and presenting a user interface comprising the inversion stack for use to determine a distance from the formation to the downhole tool in the wellbore.

Example 11 is the method of example 10, wherein generating an inversion stack comprising the first inversion slice and the second inversion slice comprises: determining the first true vertical depth of the downhole tool; receiving, from the downhole tool, electromagnetic field data comprising an electromagnetic field strength from the downhole tool at the first true vertical depth; computing a first inversion of the electromagnetic field data representing the electromagnetic field strength from the downhole tool at the first true vertical depth; determining the second true vertical depth of the downhole tool; receiving, from the downhole tool, electromagnetic field data comprising an electromagnetic field strength from the downhole tool at the second true vertical depth; computing a second inversion of the electromagnetic field data representing the electromagnetic field strength from the downhole tool at the second true vertical depth; and stacking the first inversion and the second inversion by generating an overlay of the first inversion and the second inversion.

Example 12 is the method of example 10, wherein presenting the user interface further comprises presenting a representation of a quality control indicator that presents a numerical value representing an intensity of the electromagnetic field data at a location of a bottom hole assembly, the numerical value corresponding to electromagnetic field strength measured by the downhole tool.

Example 13 is the method of example 10, wherein receiving electromagnetic field data related to the formation from measurements by the downhole tool in the wellbore comprises receiving electromagnetic field data related to the formation from measurements by the downhole tool in the wellbore that has an inclination in a range of 0 degrees to 45 degrees relative to a virtual vertical axis that traverses through an opening for the wellbore in the surface.

Example 14 is the method of example 10, wherein presenting the user interface comprising the inversion stack for use to determine a distance from the formation to the downhole tool in the wellbore comprises: presenting a first representation of the first inversion slice representing a first electromagnetic resistivity at the first true vertical depth; presenting a second representation of the second inversion slice representing a second electromagnetic resistivity at the second true vertical depth; and presenting a formation representation by visualizing a boundary of the formation by changing a color from the first representation and the second representation.

Example 15 is the method of examples 10-14, wherein presenting the user further comprises representing the first inversion slice, the second inversion slice, and the inversion stack as three-dimensional wedges.

Example 16 is the method of examples 10-14, wherein presenting the user interface further comprises: presenting a first graphical user interface element comprising: the first inversion slice depicting the first true vertical depth, an upper portion of the first inversion slice at an angle from a virtual vertical axis, and a lower portion of the first inversion slice at the angle from a virtual vertical axis; the second inversion slice depicting the second true vertical depth, an upper portion of the second inversion slice at the angle from the virtual vertical axis, and a lower portion of the second inversion slice at the angle from the virtual vertical axis; presenting a second graphical user interface element comprising: an inversion plot of the electromagnetic field data that presents the resistivity of the formation as a function of true vertical depth and measured depth, the inversion plot having a series of vertical lines at a plurality of measured depths; presenting, for each measured depth of the plurality of measured depths: the first inversion slice depicting the first true vertical depth, an upper triangle of the first inversion slice, and a lower triangle of the first inversion slice; the second inversion slice depicting the second true vertical depth, an upper triangle of the second inversion slice, and a lower triangle of the second inversion slice at the angle from the virtual vertical axis; and presenting a third graphical user interface element comprising a plot of a quality metric for a plurality of true vertical depths.

Example 17 is a graphical user interface comprising: a first graphical user interface element comprising: a first inversion slice depicting a first true vertical depth, an upper portion of the first inversion slice at an angle from a virtual vertical axis, and a lower portion of the first inversion slice at the angle from a virtual vertical axis; a second inversion slice depicting a second true vertical depth, an upper portion of the second inversion slice at the angle from the virtual vertical axis, and a lower portion of the second inversion slice at the angle from the virtual vertical axis; a second graphical user interface element comprising: an inversion plot of electromagnetic field data that represents the resistivity of the formation as a function of true vertical depth and measured depth; and a third graphical user interface element comprising a plot of a quality metric for a plurality of true vertical depths.

Example 18 is the graphical user interface of example 17, wherein the inversion plot comprises: a series of vertical lines at a plurality of measured depths; and for each of the plurality of measured depths: the first inversion slice representing the first true vertical depth, an upper triangle of the first inversion slice, and a lower triangle of the first inversion slice; and the second inversion slice representing the second true vertical depth, an upper triangle of the second inversion slice, and a lower triangle of the second inversion slice at the angle from the virtual vertical axis.

Example 19 is the graphical user interface of example 17, wherein the first graphical user interface element, the second graphical user interface element, and the third graphical user interface element are displayed for determining the location of a formation from a current position of a downhole tool.

Example 20 is the graphical user interface of examples 17-19, wherein the displaying a first graphical user interface element further comprises: the virtual vertical axis that depicts a plurality of true vertical depths; the first inversion slice oriented at an inclination angle measured from the virtual vertical axis; and the second inversion slice oriented at the inclination angle; and a bottom hole assembly oriented at the inclination angle.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer-readable medium having program code that is stored thereon, the program code being executable by one or more processing devices for performing operations comprising:
    receiving electromagnetic field data related to a formation from measurements by a downhole tool in a wellbore;
    generating a first inversion slice that represents an inversion of the electromagnetic field data about the formation at a first true vertical depth;
    generating a second inversion slice that represents an inversion of the electromagnetic field data about the formation at a second true vertical depth;
    generating an inversion stack comprising the first inversion slice and the second inversion slice; and
    displaying a user interface comprising the inversion stack for use to determine a distance from the formation to the downhole tool in the wellbore, the user interface comprising graphical outputs that include:
        the first inversion slice depicting the first true vertical depth, an upper portion of the first inversion slice being visually oriented at an angle from a virtual vertical axis, and a lower portion of the first inversion slice being visually oriented at the angle from the virtual vertical axis; and
        the second inversion slice depicting the second true vertical depth, an upper portion of the second inversion slice being visually oriented at the angle from the virtual vertical axis, and a lower portion of the second inversion slice being visually oriented at the angle from the virtual vertical axis.

2. The non-transitory computer-readable medium of claim 1, wherein the operation of generating an inversion stack comprising the first inversion slice and the second inversion slice comprises:
    determining the first true vertical depth of the downhole tool;
    receiving, from the downhole tool, electromagnetic field data comprising an electromagnetic field strength from the downhole tool at the first true vertical depth;
    computing a first inversion of the electromagnetic field data representing the electromagnetic field strength from the downhole tool at the first true vertical depth;
    determining the second true vertical depth of the downhole tool;
    receiving, from the downhole tool, electromagnetic field data comprising an electromagnetic field strength from the downhole tool at the second true vertical depth;
    computing a second inversion of the electromagnetic field data representing the electromagnetic field strength from the downhole tool at the second true vertical depth; and
    stacking the first inversion and the second inversion by generating an overlay of the first inversion and the second inversion.

3. The non-transitory computer-readable medium of claim 1, wherein the operation of displaying the user interface further comprises presenting a representation of a quality control indicator that presents a numerical value representing an intensity of the electromagnetic field data at a location of a bottomhole assembly, the numerical value corresponding to electromagnetic field strength measured by the downhole tool.

4. The non-transitory computer-readable medium of claim 1, wherein the operation of receiving electromagnetic field data related to the formation from measurements by the downhole tool in the wellbore comprises receiving electromagnetic field data related to the formation from measurements by the downhole tool in the wellbore that has an inclination in a range of 0 degrees to 45 degrees relative to the virtual vertical axis that traverses through an opening for the wellbore at a well surface.

5. The non-transitory computer-readable medium of claim 1, wherein the operation of displaying the user interface comprising the inversion stack for use to determine a distance from the formation to the downhole tool in the wellbore comprises:
  outputting a first visual representation of the first inversion slice representing a first electromagnetic resistivity at the first true vertical depth;
  outputting a second visual representation of the second inversion slice representing a second electromagnetic resistivity at the second true vertical depth; and
  outputting a formation representation by visualizing a boundary layer of the formation by changing a color from the first visual representation and the second visual representation.

6. The non-transitory computer-readable medium of claim 5, wherein the operation of displaying the user interface includes outputting the first inversion slice, the second inversion slice, and the inversion stack as three-dimensional wedges.

7. The non-transitory computer-readable medium of claim 1, wherein the graphical outputs correspond to a first graphical user interface element, and wherein the operation of displaying the user interface comprises:
  outputting the first graphical user interface element in the user interface;
    outputting a second graphical user interface element in the user interface, the second graphical user interface element comprising:
    an inversion plot of the electromagnetic field data that presents a resistivity of the formation as a function of true vertical depth and measured depth, the inversion plot having a series of vertical lines at a plurality of measured depths;
  outputting in the user interface, for each measured depth of the plurality of measured depths:
    the first inversion slice depicting the first true vertical depth, an upper triangle of the first inversion slice, and a lower triangle of the first inversion slice; and
    the second inversion slice depicting the second true vertical depth, an upper triangle of the second inversion slice, and a lower triangle of the second inversion slice at the angle from the virtual vertical axis; and
  outputting a third graphical user interface element in the user interface, the third graphical user interface element comprising a plot of a quality metric for a plurality of true vertical depths.

8. The non-transitory computer-readable medium of claim 1, wherein the operation of displaying the user interface comprises:
  outputting a first graphical user interface element in the user interface, the first graphical user interface element comprising:
    the first inversion slice depicting the first true vertical depth, a left portion of the first inversion slice being oriented at the angle from the virtual vertical axis, and a right portion of the first inversion slice being oriented at the angle from the virtual vertical axis; and
    the second inversion slice depicting the second true vertical depth, a left portion of the second inversion slice being oriented at the angle from the virtual vertical axis, and a right portion of the second inversion slice being oriented at the angle from the virtual vertical axis; and
    a visual representation of a bottom hole assembly oriented along the virtual vertical axis.

9. The non-transitory computer-readable medium of claim 1, wherein the operation of displaying the user interface comprises:
  outputting a first graphical user interface element in the user interface, the first graphical user interface element comprising:
    the virtual vertical axis that depicts a plurality of true vertical depths;
    the first inversion slice depicting the first true vertical depth, the first inversion slice oriented at an inclination angle measured from the virtual vertical axis; and
    the second inversion slice depicting the first true vertical depth, the second inversion slice oriented at the inclination angle; and
    a visual representation of a bottom hole assembly oriented at the inclination angle.

10. A method of visualizing a formation in a well-drilling operation, the method comprising:
  receiving electromagnetic field data related to a formation from measurements by a downhole tool in a wellbore;
  generating a first inversion slice that represents an inversion of the electromagnetic field data at a first true vertical depth;
  generating a second inversion slice that represents an inversion of the electromagnetic field data at a second true vertical depth;
  generating an inversion stack comprising the first inversion slice and the second inversion slice; and
  presenting a user interface comprising the inversion stack for use to determine a distance from the formation to the downhole tool in the wellbore, the user interface comprising graphical outputs that include:
    the first inversion slice depicting the first true vertical depth, an upper portion of the first inversion slice being visually oriented at an angle from a virtual vertical axis, and a lower portion of the first inversion slice being visually oriented at the angle from the virtual vertical axis; and
    the second inversion slice depicting the second true vertical depth, an upper portion of the second inversion slice being visually oriented at the angle from the virtual vertical axis, and a lower portion of the second inversion slice being visually oriented at the angle from the virtual vertical axis.

11. The method of claim 10, wherein generating an inversion stack comprising the first inversion slice and the second inversion slice comprises:
  determining the first true vertical depth of the downhole tool;

receiving, from the downhole tool, electromagnetic field data comprising an electromagnetic field strength from the downhole tool at the first true vertical depth;

computing a first inversion of the electromagnetic field data representing the electromagnetic field strength from the downhole tool at the first true vertical depth;

determining the second true vertical depth of the downhole tool;

receiving, from the downhole tool, electromagnetic field data comprising an electromagnetic field strength from the downhole tool at the second true vertical depth;

computing a second inversion of the electromagnetic field data representing the electromagnetic field strength from the downhole tool at the second true vertical depth; and stacking the first inversion and the second inversion by generating an overlay of the first inversion and the second inversion.

12. The method of claim 10, wherein presenting the user interface further comprises presenting a representation of a quality control indicator that presents a numerical value representing an intensity of the electromagnetic field data at a location of a bottom hole assembly, the numerical value corresponding to electromagnetic field strength measured by the downhole tool.

13. The method of claim 10, wherein receiving electromagnetic field data related to the formation from measurements by the downhole tool in the wellbore comprises receiving electromagnetic field data related to the formation from measurements by the downhole tool in the wellbore that has an inclination in a range of 0 degrees to 45 degrees relative to the virtual vertical axis that traverses through an opening for the wellbore at a well surface.

14. The method of claim 10, wherein presenting the user interface comprising the inversion stack for use to determine a distance from the formation to the downhole tool in the wellbore comprises:

outputting a first visual representation of the first inversion slice representing a first electromagnetic resistivity at the first true vertical depth;

outputting a second visual representation of the second inversion slice representing a second electromagnetic resistivity at the second true vertical depth; and outputting a formation representation by visualizing a boundary of the formation by changing a color from the first visual representation and the second visual representation.

15. The method of claim 14, wherein presenting the user interface further comprises outputting the first inversion slice, the second inversion slice, and the inversion stack as three-dimensional wedges.

16. The method of claim 10, wherein the graphical outputs correspond to a first graphical user interface element, and wherein presenting the user interface further comprises:

outputting the first graphical user interface element in the user interface;

outputting a second graphical user interface element in the user interface, the second graphical user interface element comprising:

an inversion plot of the electromagnetic field data that presents a resistivity of the formation as a function of true vertical depth and measured depth, the inversion plot having a series of vertical lines at a plurality of measured depths;

outputting in the user interface, for each measured depth of the plurality of measured depths:

the first inversion slice depicting the first true vertical depth, an upper triangle of the first inversion slice, and a lower triangle of the first inversion slice;

the second inversion slice depicting the second true vertical depth, an upper triangle of the second inversion slice, and a lower triangle of the second inversion slice at the angle from the virtual vertical axis; and outputting a third graphical user interface element in the user interface, the third graphical user interface element comprising a plot of a quality metric for a plurality of true vertical depths.

17. A system comprising:

a processor; and a non-transitory computer-readable medium comprising instructions that are executable by the processor to cause the processor to output a graphical user interface for display on a display device, the graphical user interface comprising:

a first graphical user interface element comprising a first set of visual outputs that include:

a first inversion slice depicting a first true vertical depth, an upper portion of the first inversion slice being oriented at an angle from a virtual vertical axis, and a lower portion of the first inversion slice being oriented at the angle from the virtual vertical axis;

a second inversion slice depicting a second true vertical depth, an upper portion of the second inversion slice being oriented at the angle from the virtual vertical axis, and a lower portion of the second inversion slice being oriented at the angle from the virtual vertical axis;

a second graphical user interface element comprising a visual output that includes:

an inversion plot of electromagnetic field data that visually represents resistivity of a formation as a function of true vertical depth and measured depth; and a third graphical user interface element comprising another visual output that includes a plot of a quality metric for a plurality of true vertical depths.

18. The graphical system of claim 17, wherein the inversion plot comprises:

a series of vertical lines at a plurality of measured depths; and for each of the plurality of measured depths:

the first inversion slice representing the first true vertical depth, an upper triangle of the first inversion slice, and a lower triangle of the first inversion slice; and the second inversion slice representing the second true vertical depth, an upper triangle of the second inversion slice, and a lower triangle of the second inversion slice at the angle from the virtual vertical axis.

19. The system of claim 17, wherein the first graphical user interface element, the second graphical user interface element, and the third graphical user interface element are usable for determining a location of the formation from a current position of a downhole tool.

20. The system of claim 17, wherein the first graphical user interface element further comprises:

the virtual vertical axis that depicts a plurality of true vertical depths;

the first inversion slice oriented at an inclination angle measured from the virtual vertical axis;

the second inversion slice oriented at the inclination angle; and a bottom hole assembly oriented at the inclination angle.

\* \* \* \* \*